W. H. HUTCHINSON.
HYDROMETRIC EGG DETECTOR.
APPLICATION FILED MAY 4, 1912.
1,075,477.
Patented Oct. 14, 1913.
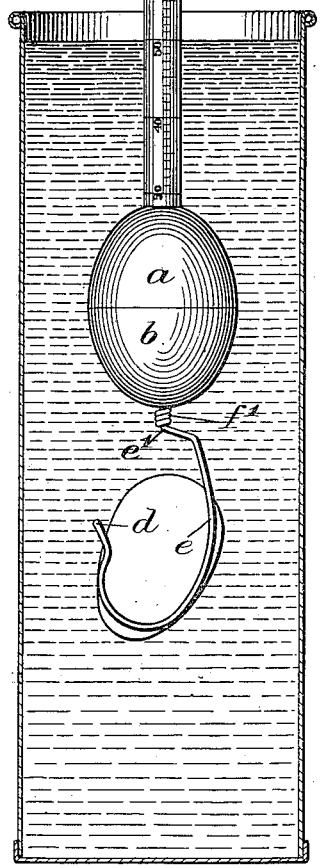
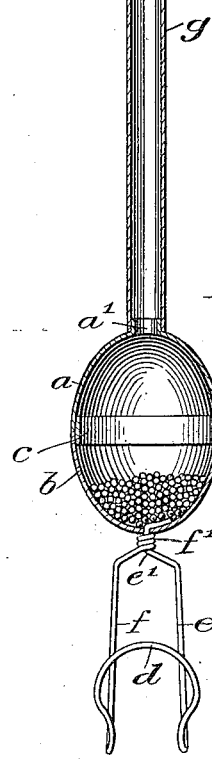
Inventor
William H. Hutchinson

UNITED STATES PATENT OFFICE.

WILLIAM H. HUTCHINSON, OF ROCHESTER, NEW YORK.

HYDROMETRIC EGG-DETECTOR.

1,075,477.

Specification of Letters Patent.  Patented Oct. 14, 1913.

Application filed May 4, 1912. Serial No. 695,187.

*To all whom it may concern:*

Be it known that I, WILLIAM H. HUTCHINSON, of Rochester, in the county of Monroe and State of New York, have invented certain new and useful Improvements in Hydrometric Egg-Detectors; and I do hereby declare the following to be a full, clear, and exact description of the same, reference being had to the accompanying drawings, forming a part of this specification, and to the reference-numerals marked thereon.

My present invention relates to hydrometric egg detectors and it has for its object to provide an instrument of this character which will serve as a means of indicating the character and quality of an egg in all of the various stages through which it passes, from a strictly fresh condition to a state where it is unfit for use, by determining its specific gravity.

My invention also has for its object to provide such an instrument comprising a buoyant body, an egg holder thereon and an indicating stem, said body being made in sections to one of which each of the other parts are attached.

To these and other ends the invention consists in certain improvements and combinations of parts all as will be hereinafter more fully described, the novel features being pointed out in the claim at the end of the specification.

In the drawings: Figure 1 is a side elevation illustrating a device constructed in accordance with my invention, and Fig. 2 is a vertical sectional view thereof.

Similar reference numerals in the several figures indicate the same parts.

A hydrometric egg tester embodying my invention is intended to be used, not merely for the purpose of measuring the extreme conditions of an egg and indicating whether it is "good" or "bad", but for indicating within a wide range the changes which may have occurred in the condition of an egg between the state of strict freshness and rottenness. Such an instrument may be used to grade and separate eggs into classes according to their specific gravity which I have determined is a sure indication of their condition, irrespective of their age, since the condition, within certain limits, does not depend so much upon age as upon the quality of the contents and the temperature at which they have been maintained.

In carrying out my invention, I employ a float preferably comprising a hollow body made of metal and formed of upper and lower piece $a$ and $b$ rounded, as shown and which may be brazed or soldered at their meeting edges or otherwise united as by a joint band $c$. These sections are preferably constructed in the form shown as their shape permits them to be easily formed by stamping or spinning of comparatively thin sheet metal and another advantage is obtained in that the rounded upper and lower ends of the body afford little or no resistance to its vertical movement when immersed in a liquid, such as water.

Attached to the lower end of the body is the egg holder. This is formed of a single piece of wire looped at the center $d$ to form the two side arms $e$ and $f$ which are then bent into the shape of a hook and form a saddle capable of supporting eggs of various sizes. The two side portions of the holder are united by wrapping the extremity of one, $f'$, around the end, $e'$, of the other which latter is allowed to project beyond the coil to form a fastener which may be projected through an aperture in the lower end or section of the body and secured thereto.

The indicating scale preferably comprises a tube $g$, having suitable graduated indications thereon as shown in Fig. 1. This tube is fastened permanently to the neck $a'$ formed upon the upper section of the body and the interior of the latter and the tube communicate for the purpose of forming a single air chamber which plays an important part in the operation of the device. The opening between the body and the tube also allows small shot, or other objects, to be inserted and passed to the bottom of the body for the purpose of weighting it in the first instance, or may be required to standardize different instruments. The top of the tube is closed by a cap $g'$.

The instrument constructed in the manner described is so proportioned and adjusted that a goodly portion, such as about one third, of the scale tube will be submerged below the surface of the water when it is without a load. The graduations on the tube are applied without reference to this unloaded float point so that the lesser divisions will indicate conditions of staleness passing into rottenness without elevating the float to that point where it will capsize. The testing of an egg to determine its condition after it has reached the state in which it floats, I deem important, for although such an egg when first coming to the float point does not possess qualities adapting it for table use, nevertheless such an egg may be used most satisfactorily for cooking purposes, which do not require perfect freshness.

It is very desirable in an instrument of this character that a long stem or scale bar be employed whether the device is intended for use by the producer or the dealer in grading of eggs or is to be employed for the testing of eggs for table use. The long scale bar employed upon a body which is adjusted in weight to float at a given point of submergence provides a range within the extremes of the scale, permitting a large number of coarse graduations to be used and as many as fifteen or twenty of these subdivisions to be devoted to each of the commercial classes, or grades, of eggs known as "strictly fresh", "fresh", "good", "fair" and "stale".

I claim as my invention:

An egg detector comprising a hollow body portion formed of separate cup-shaped sections held together by a separate ring disposed interiorly of the sections, a holder formed of wire attached to one section, a neck formed on the upper section, a tubular scale member secured to said neck, and a removable cover at the upper end of the tubular scale member, said scale member being provided with graduations adapted to coöperate with the surface of a liquid in which the instrument is submerged.

WILLIAM H. HUTCHINSON.

Witnesses:
G. WILLARD RICH,
ERWIN S. PLUMB.

---

Copies of this patent may be obtained for five cents each, by addressing the "Commissioner of Patents, Washington, D. C."